US007486739B2

United States Patent
Hottinen et al.

(10) Patent No.: US 7,486,739 B2
(45) Date of Patent: Feb. 3, 2009

(54) TRANSMISSION METHOD AND TRANSMITTER

(75) Inventors: Ari Hottinen, Espoo (FI); Olav Tirkkonen, Helsinki (FI)

(73) Assignee: Nokia Corporation, Espoo (FI)

( * ) Notice: Subject to any disclaimer, the term of this patent is extended or adjusted under 35 U.S.C. 154(b) by 625 days.

(21) Appl. No.: 10/770,395

(22) Filed: Feb. 4, 2004

(65) Prior Publication Data

US 2005/0105629 A1    May 19, 2005

(30) Foreign Application Priority Data

Nov. 17, 2003    (FI)    ................... 20031668

(51) Int. Cl.
*H04B 7/02* (2006.01)
*H04B 7/06* (2006.01)

(52) U.S. Cl. .................. 375/267; 375/260; 375/285; 375/296

(58) Field of Classification Search .............. 375/260, 375/261, 267, 298, 299, 308; 455/101–103
See application file for complete search history.

(56) References Cited

U.S. PATENT DOCUMENTS

| 6,002,715 | A | * | 12/1999 | Brailean et al. ............. 375/227 |
| 2002/0154705 | A1 | * | 10/2002 | Walton et al. ................ 375/267 |
| 2003/0043929 | A1 | * | 3/2003 | Sampath ....................... 375/267 |
| 2003/0048856 | A1 | * | 3/2003 | Ketchum et al. ............. 375/260 |
| 2004/0120287 | A1 | * | 6/2004 | Lott et al. .................... 370/332 |

FOREIGN PATENT DOCUMENTS

WO   WO 03/001728 A1   1/2003
WO   WO 03001728   *  1/2003

OTHER PUBLICATIONS

M. O. Damen, et al., "Diagonal Algebraic Space-Time Block Codes", IEE Transactions on Information Theory, vol. 48, No. 3, pp. 628-636, Mar. 2002.
H. El Gamal et al., An Algebraic Number Theoretic Framework for Space-Time Coding, Proc. ISIT, Jun. 2002, p. 132.
Dayal, P. et al. "Algebraic Space-Time Codes with Full Diversity and Low Peak-To-Mean Power Ratio", Globecom 2003, pp. 1946-1951.
Damen, M. O. et al. "On Diagonal Algebraic Space-Time Block Codes", IEEE Transactions On Communications, vol. 51, No. 6, Jun. 2003, pp. 911-919.
Fan P. "Design of Diagonal Algebraic Space Time Codes With 8-Star-PSK Signals", The 14th IEEE 2003 International Symposium on Personal, Indoor and Mobile Radio Communication Proceedings, pp. 1036-1040.

* cited by examiner

*Primary Examiner*—Shuwang Liu
*Assistant Examiner*—David Huang
(74) *Attorney, Agent, or Firm*—Squire, Sanders & Dempsey, LLP

(57) ABSTRACT

A transmitter and an applicable method include an antenna system for achieving two transmit paths, a first modulator for modulating a signal to be transmitted into complex modulation symbols, and a second modulator for constructing layered channel symbols as linear combinations of the complex modulation symbols. The second modulator constructs channel symbols by using first and second non-zero coefficients when performing the linear combination. The ratio of the first and second coefficients is not a real number. The channel symbols are transmitted by using a first non-zero total power for transmission on a first transmit path, and a second non-zero total power for transmission on a second transmit path, wherein the first and second total powers are not equal.

16 Claims, 2 Drawing Sheets

Figure 1:
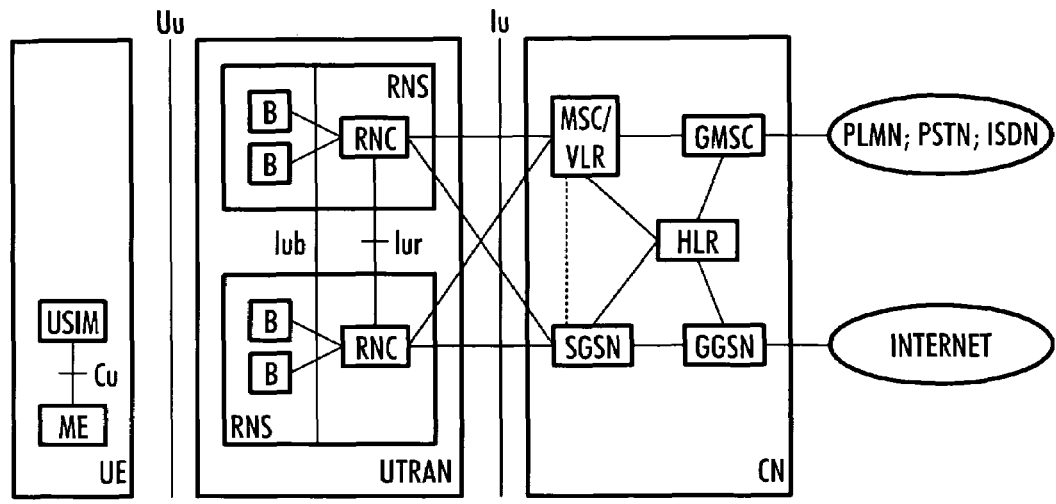

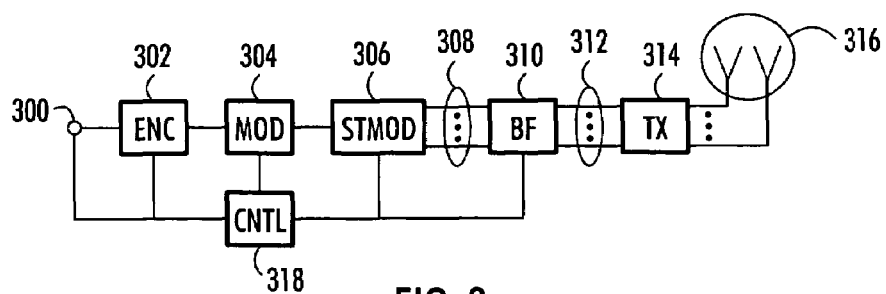
FIG. 3
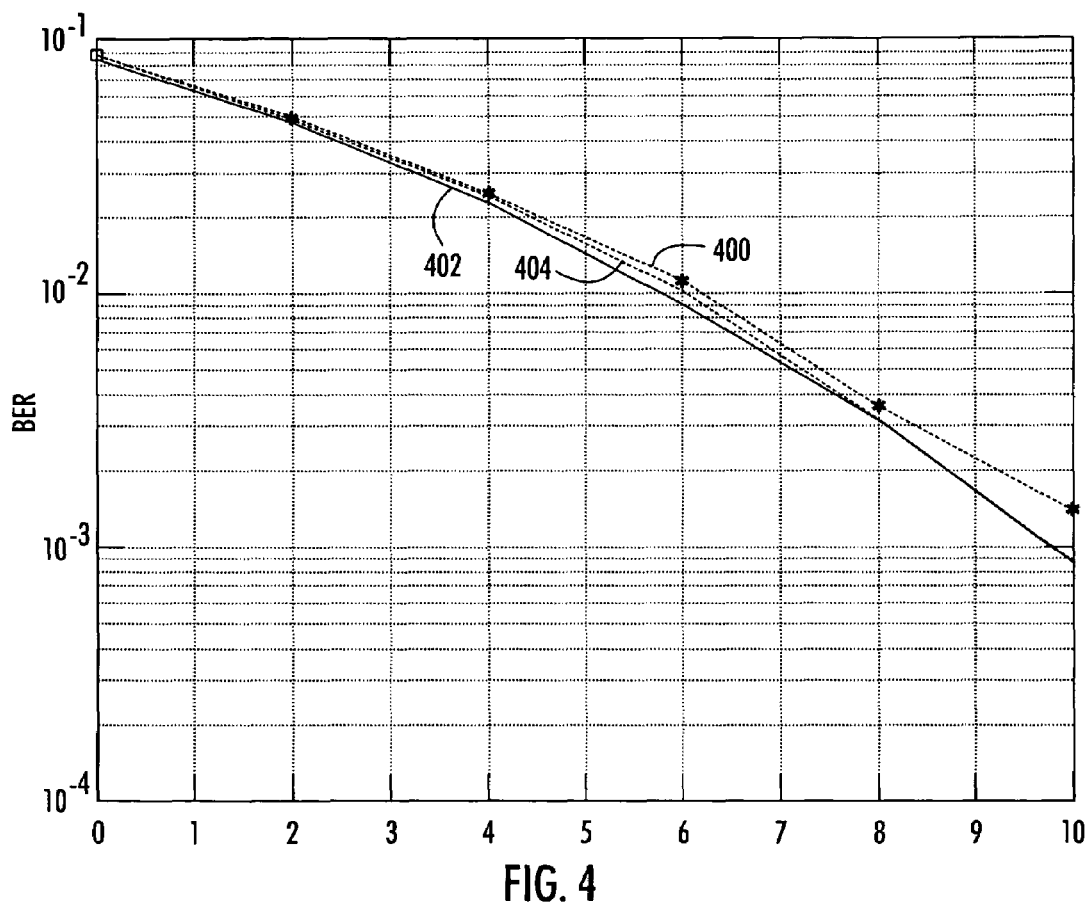
FIG. 4
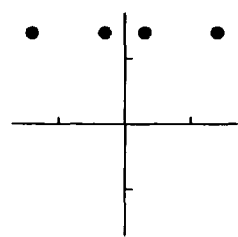 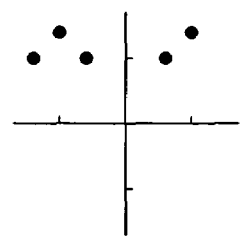
FIG. 5A        FIG. 5B

TRANSMISSION METHOD AND TRANSMITTER

FIELD

The invention relates to a transmitter and a transmission method in a radio system. The invention relates particularly to a transmission method using more than one transmit path in the transmitter.

BACKGROUND

In telecommunication, the transmission path used to relay signals is known to cause interference to the transmitted signals. This occurs regardless of the physical form of the transmission path, whether it is for instance a radio link, an optical fibre or a copper cable. Particularly in radio communication, situations often arise wherein the quality of the transmission path varies from one data link to another and during the link, too.

Fading is a typical phenomenon on the radio path, causing changes to the transmission channel. Other simultaneous links may also cause interference, which may vary as a function of time and place.

A solution to the problem is the use of diversity in the transmitter. Temporal diversity uses interleaving and coding, which achieve temporal diversity in the signal to be transmitted. However, the disadvantage here is that delays are created in the transmission, especially when the channel is slowly fading. In frequency diversity, in turn, the signal is transmitted simultaneously at several frequencies. However, this is an ineffective method when the channel has a wide coherence bandwidth.

Antenna diversity uses more than one antenna in signal transmission and/or reception. The signal components that multipath propagate through different channels are then not likely to be disturbed by simultaneous fading. In receive diversity, two or more antennas having a different location or polarization are used to receive a transmitted signal. A disadvantage in receive diversity is that the use of two antennas is difficult to implement in a small-sized terminal. In transmit diversity, the same signal is transmitted to the receiver using two or more different antennas. Transmit diversity is more easily applicable in downlink in mobile telephone systems than receive diversity, since it is easier to provide a base station than a terminal with more than one antenna.

With multiple antennas at the base station, and one antenna at the mobile station, the uplink may be called a SIMO (single-input multiple-output) radio channel, whereas the downlink may be called a MISO (multiple-input single-output) channel. In a MIMO (multiple-input multiple-output) system, multiple antennas are employed both at the transmitter and the receiver. In fading channels, these create transmit and receiver diversity, respectively. MIMO can achieve good performance, but it depends on the signals transmitted and received via different antennas and propagating via different channels. In other words, the channels should not correlate much with each other.

The aim in telecommunication is not only to transmit a signal as faultlessly as possible but also to transfer information as efficiently as possible. Herein, efficiency means that the aim is to utilize the capacity of the transmission channel as efficiently as possible in data transmission. The transmission rates to be achieved in planning cellular radio systems are particularly interesting.

Conventionally, the use of diversity and an increase in transmission rate have been mutually exclusive alternatives.

In H. El Gamal and M. Damen: An algebraic number theoretic framework for space-time coding, Proc. ISIT, June 2002, p. 132, a precoding of a space time coding matrix is proposed, where a Hadamard transform is utilised on rotated symbols. This results in a Maximally Symbolwise Diverse (MSD) scheme. This means that each individual symbol is transmitted with a unitary matrix. The prior art precoders are either real max-symbolwise diversity (MSD), like the Hadamard precoder above, or real and non-MSD.

BRIEF DESCRIPTION OF THE INVENTION

The object of the invention is to provide a method and an apparatus for implementing the method by using transmit diversity to achieve a high transmission rate and good resistance to interference.

According to an embodiment of the invention, there is provided a transmission method comprising constructing layered channel symbols as linear combinations of complex modulation symbols, transmitting the channel symbols via at least two transmit paths, using, when constructing the channel symbols, in at least one layer, at least a first and a second non-zero coefficient when performing a linear combination, wherein the ratio of the first and second coefficient is not a real number, and using, for at least one modulation symbol, a first non-zero total power for transmission on a first transmit path, and a second non-zero total power for transmission on a second transmit path, wherein the first and second total powers are not equal.

According to another embodiment of the invention, there is provided a transmitter comprising antenna means for achieving two transmit paths for the transmission of a signal, means for modulating a signal to be transmitted into complex modulation symbols, means for constructing layered channel symbols as linear combinations of the complex modulation symbols. The transmitter further comprises means for constructing channel symbols by using, in at least one layer, at least a first and a second non-zero coefficient when performing the linear combination, wherein the ratio of the first and second coefficient is not a real number, and means for transmitting the channel symbols by using, for at least one modulation symbol, a first non-zero total power for transmission on a first transmit path, and a second non-zero total power for transmission on a second transmit path, wherein the first and second total powers are not equal.

According to another embodiment of the invention, there is provided a transmitter comprising an antenna system for achieving two transmit paths for the transmission of a signal, a first modulator for modulating a signal to be transmitted into complex modulation symbols, a second modulator for constructing layered channel symbols as linear combinations of the complex modulation symbols. The second modulator is configured to construct channel symbols by using, in at least one layer, at least a first and a second non-zero coefficient when performing the linear combination, wherein the ratio of the first and second coefficient is not a real number, and the second modulator and the antenna system are configured to transmit the channel symbols by using, for at least one modulation symbol, a first non-zero total power for transmission on a first transmit path, and a second non-zero total power for transmission on a second transmit path, wherein the first and second total powers are not equal.

According to another embodiment of the invention, there is provided a base station transmitter of a cellular radio system, comprising an antenna system for achieving two transmit paths for the transmission of a signal, a first modulator for modulating a signal to be transmitted into complex modulation symbols, a second modulator for constructing layered channel symbols as linear combinations of the complex modulation symbols. The second modulator is configured to construct channel symbols by using, in at least one layer, at least a first and a second non-zero coefficient when performing the linear combination, wherein the ratio of the first and second coefficient is not a real number, and the second modulator and the antenna system are configured to transmit the channel symbols by using, for at least one modulation symbol, a first non-zero total power for transmission on a first transmit path, and a second non-zero total power for transmission on a second transmit path, wherein the first and second total powers are not equal.

According to another embodiment of the invention, there is provided terminal equipment of a cellular radio system, comprising an antenna system for achieving two transmit paths for the transmission of a signal, a first modulator for modulating a signal to be transmitted into complex modulation symbols, a second modulator for constructing layered channel symbols as linear combinations of the complex modulation symbols. The second modulator is configured to construct channel symbols by using, in at least one layer, at least a first and a second non-zero coefficient when performing the linear combination, wherein the ratio of the first and second coefficient is not a real number, and the second modulator and the antenna system are configured to transmit the channel symbols by using, for at least one modulation symbol, a first non-zero total power for transmission on a first transmit path, and a second non-zero total power for transmission on a second transmit path, wherein the first and second total powers are not equal.

This invention relates to a method and apparatus enabling wireless information transfer between two spatially separate units, where at least the transmitter has at least two transmit paths. The transmit paths may be realized using arbitrary means, such as omni-directional antennas or beam forming with or without channel information, for example.

The embodiments of the invention provide several advantages. Some performance measures, which are related to linear matrix modulation methods are diversity order and coding gain. Diversity order can be associated with the rank of a codeword difference matrix:

$$D^{(ce)} = X^{(c)} - X^{(e)}, \quad (1)$$

where $D^{(ce)}$ is the codeword difference matrix, which describes the difference between $X^{(c)}$, the transmitted codeword, and $X^{(e)}$, the received codeword. Coding gain considers the absolute value of the determinant of codeword difference matrix (product of non-zero eigenvalues). At infinite SNR, the performance criterion commonly used in designing space-time codes is $$\min_{X^{(c)} \neq X^{(e)}} \det D^{(ce)H} D^{(ce)}. \quad (2)$$

The embodiments of the invention maintain the same diversity order as the prior art but have a higher coding gain.

Prior art full-rate (where the symbol rate equals to the number of transmit antennas) designs that use complex preceding matrices are such that they require homogenous symbol preceding, where each symbol is rotated so that the power of each symbol is distributed equally across all selected transmission resources. MSD precoding results from using a preceding matrix where each (non-zero) element of the matrix has identical power. This has the drawback of increasing Peak-to-Average power Ratio (PAR), which complicates power amplifier design. In addition, optimal diversity or coding gain is not always found. Both of these drawbacks can be avoided with the presented solution.

In an embodiment, PAR is reduced in the transmitter while simultaneously improving performance over prior art designs in Rayleigh fading channels.

In an embodiment, the above is achieved by using at least one complex unitary preceding matrix that contains at least two non-zero elements that have different transmission powers. These are used to construct layers for a high symbol rate (more than one symbol per channel use) modulation alphabet, where one encoding dimension is space and at least one other dimension is selected from time, frequency, code, waveform, or Doppler domain, for example.

In an embodiment, the channel symbols transmitted from different antennas and at different times are reduced to equidistant QAM (Quadrature Amplitude Modulation) constellations, so that each antenna uses just one constellation. This simplifies implementation, especially if for instance 16-QAM is already implemented by hardware.

LIST OF DRAWINGS

Figure 2:
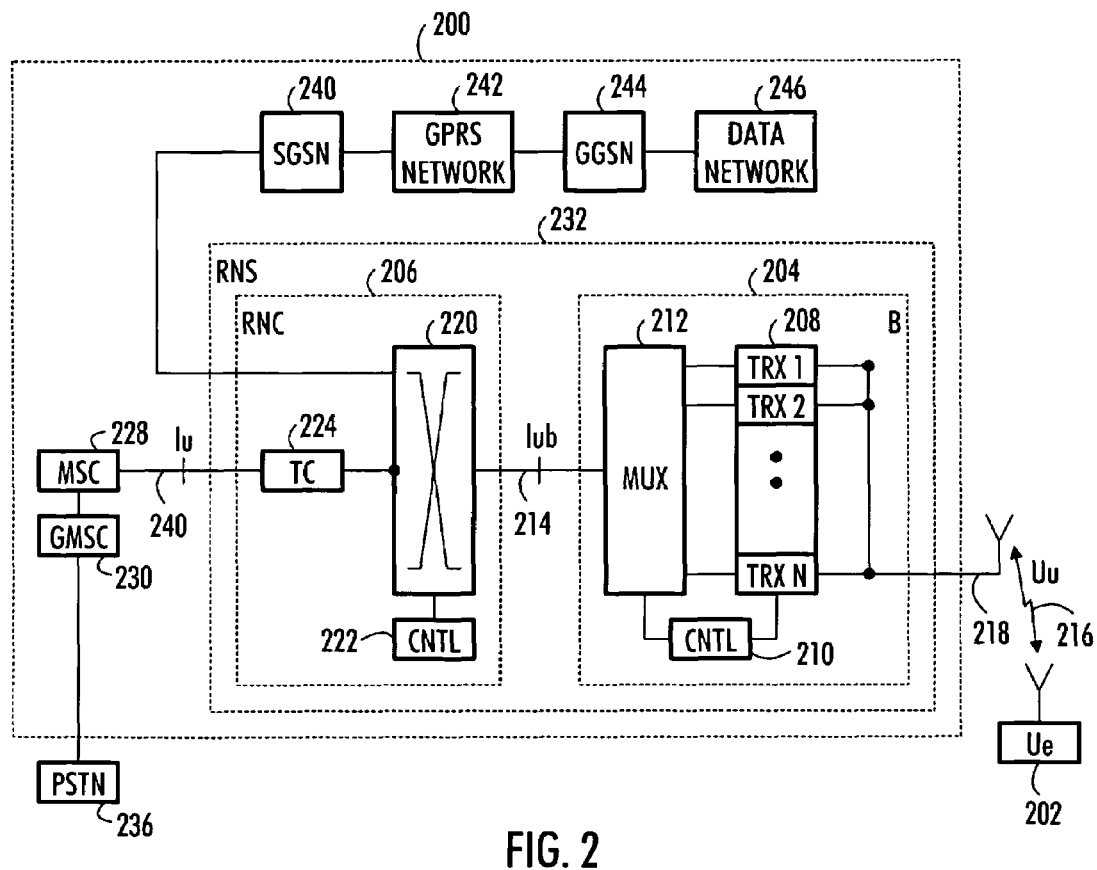

In the following, the invention will be described in greater detail with reference to the preferred embodiments and the accompanying drawings, in which FIG. 1 illustrates the structure of a telecommunications system used as an example, FIG. 2 illustrates in more detail the structure of a telecommunications system used as an example, FIG. 3 illustrates an example of a transmitter according to an embodiment, FIG. 4 illustrates the performance of two embodiments of the invention, and FIG. 5 illustrates channel symbol constellations corresponding to two embodiments of the invention.

DESCRIPTION OF EMBODIMENTS

The structure of the UMTS mobile telephone system, used as an example of a system in which the embodiments of the invention are applicable, will be described with reference to FIG. 1.

The main parts of a mobile telephone system are a core network CN, a UMTS terrestrial radio access network UTRAN and user equipment UE. The interface between the core network CN and the radio access network UTRAN is called Iu, and the air interface between the UTRAN and the UE is called Uu.

The user equipment UE is composed of two parts: mobile equipment ME comprising a radio terminal used to establish a radio link over the interface Uu and a UMTS subscriber identity module USIM which is a smart card comprising data on the identity of the subscriber and typically performs identification algorithms, stores encryption parameters and subscriber data.

The UTRAN is composed of radio network subsystems RNS. An RNS is composed of a radio network controller RNC and one or more nodes B. In practice, node B refers to a base station. The radio network controller RNC manages radio resources by base stations connected thereto.

The core network CN is composed of several parts. A home location register HLR is a database in a subscriber's home system for maintaining a user service profile. The home location register also maintains data on user locations with the accuracy of an MSC. A mobile services switching centre/visitor location register MSCNLR is a switch (MSC) and a database (VLR) servicing the terminal equipment as regards circuit-switched (CS) services. The MSC switches circuit-switched services and the VLR maintains data on the user profile and location. A gateway MSC GMSC is in turn a switch connecting the UMTS to external services or networks. All circuit-switched connections are switched via the GMSC. The functionality of a serving GPRS (General Packet Radio Service) support node SGSN corresponds to the functionality of the MSCNLR, but it forwards packet-switched (PS) connections. Correspondingly, a gateway GPRS support node GGSN corresponds functionally to the GMSC, but as regards packet-switched connections. External networks can be divided into two types: circuit-switched networks, such as existing telephone networks, and packet-switched networks, such as the Internet.

The UTMS comprises several specified interfaces. A Cu interface is located between the smart card USIM and the mobile equipment ME. The Uu interface is located between the terminal equipment and the base station. The interface between the core network CN and the radio access network UTRAN is called Iu. The interface between the radio network subsystems RNS is called Iur. This enables soft handovers between radio network controllers of different manufacturers. The interface between a radio network controller RNC and a base station B is called Iub.

FIG. 1 shows the structure on quite a general level, wherefore it will be illustrated in more detail in FIG. 2 by means of an example of a cellular radio system. FIG. 2 only shows the essential blocks, but it is apparent to a person skilled in the art that a conventional cellular radio network also includes a number of other functions and structures, which do not have to be described in more detail herein. It should also be noted that FIG. 2 shows only an exemplary structure. The details of the systems according to the invention may differ from those shown in FIG. 2, but such differences are not of significance to the invention.

A cellular radio network typically comprises a fixed network infrastructure, i.e. a network part 200, and terminal equipment 202, which can be fixed, vehicle-mounted or portable. The network part 200 includes base stations 204. A base station corresponds to node B shown in the previous figure. Several base stations 204 are controlled in a centralized manner by a radio network controller 206 communicating with them. A base station 204 comprises transceivers 208 and a multiplexer unit 212.

The base station 204 further comprises a control unit 210, which controls the operation of the transceivers (combined transmitter and receiver) 208 and the multiplexer 212. The multiplexer 212 is used to place the traffic and control channels used by several transceivers 208 to a common transmission link 214. The transmission link 214 forms the Iub interface.

The transceivers 208 of the base station 204 communicate with an antenna unit 218, which implements a bidirectional radio connection 216 to the terminal equipment 202. The structure of the frames to be transmitted over the bidirectional radio connection 216 is specified system-specifically, and it is referred to as an air interface Uu. In the preferred embodiments of the invention, at least a part of a signal is transmitted by means of three or more transmit antennas or three or more beams provided by several transmit antennas.

The radio network controller 206 comprises a group switching field 220 and a control unit 222. The group switching field 220 is used to switch speech and data and to connect signalling circuits. A radio network subsystem 232 formed by the base station 204 and the radio network controller 206 also includes a transcoder 224. The transcoder 224 is usually located as close to the mobile services switching centre 228 as possible, since speech can thus be transmitted in the cellular network format between the transcoder 224 and the radio network controller 206, thus saving transmission capacity.

The transcoder 224 transforms the different digital speech coding formats used between a public switched telephone network and a mobile telephone network to be compatible with one another, e.g. from the fixed network format to some other format of a cellular radio network format, and vice versa. The control unit 222 performs call control, mobility management, gathering of statistical data and signalling.

As shown in FIG. 2, the group switching field 220 is used to carry out switching both to a public switched telephone network (PSTN) 236 via the mobile services switching centre 228 and a gateway MSC 230 and to a packet transmission network 242.

The connection between the packet transmission network 242 and the group switching field 220 is established by an SGSN (Serving GPRS Support Node) 240. The function of the support node 240 is to transfer packets between the base station system and a GGSN (Gateway GPRS Support Node) 244, and to keep record of the terminal equipment's 202 location within its area.

The gateway node 244 connects a public packet transmission network 246 with the packet transmission network 242. An Internet protocol or an X.25 protocol can be used at the interface. The gateway node 244 encapsulates the inner structure of the packet transmission network 242 to conceal it from the public packet transmission network 246, and therefore, the public packet transmission network 246 sees the packet transmission network 242 as a subnetwork, and the public packet transmission network can address packets to and receive them from the terminal equipment 202 located in the network.

The packet transmission network 242 is typically a private network employing an Internet protocol and carrying signalling and tunnelled user data. Below the Internet protocol layer, both the architecture and protocols of the network structure 242 may vary according to operator. The public packet transmission network 246 may be the global Internet, for example.

FIG. 3 illustrates a more detailed example of a transmitter. The transmitter may be a radio terminal of user equipment or a transmitter of a base station transceiver, for example. As one skilled in the art is aware, the transmitter may also comprise other components such as filters, but for the sake of simplicity, they are not described here.

The transmitter comprises a source 300, which emits information bits b at a given source rate $R_{source}$. The bits are taken into an encoder 302, which may also perform interleaving. Typically an encoder comprises a binary encoder of code rate $R_c$. The output of the encoded comprises encoded bits, which are further taken to a modulator 304. The modulator modulates a given number of the encoded bits into a complex modulation vector x.

The output of the modulator 304 comprise modulation symbols. A modulation symbol is a complex number constructed directly from bits. For example, a QPSK symbol is constructed from two bits, whereas a 16-QAM symbol is constructed from four bits. Here QPSK refers to Quadrature Phase Shift Keying and 16-QAM refers to 16 Quadrature Amplitude Modulation. These are typical modulation methods used in transmission systems.

The output of the modulator is operationally connected to a space-time modulator 306. Let us assume that the modulated signal is to be transmitted over T substantially orthogonal transmission resources and $N_b$ transmission beams. The transmission resources may comprise time, subcarrier or spreading codes, for example. The symbol rate of the space-time modulator is $R_s$. Thus, in the space-time modulator, a sequence of $R_s$ T symbols is mapped to a $T \times N_b$ matrix X. The space-time modulator may also include precoding.

For example, with linear MIMO or MISO modulation, the space-time modulator is configured to map modulation symbols to a spacetime code matrix X linearly. The length of the space-time block is T.

The output of the space-time modulator 306 may also be called channel symbols. A channel symbol is a complex number describing the phase and amplitude transmitted from a transmit path (antenna or beam, for example) during one symbol period.

In the codes of preferred embodiments, channel symbols are constructed from modulation symbols using linear transformations.

The output signal 308 of the space-time modulator thus comprises $N_b$ parallel streams, and it is taken to a beam former 310. The beam former 310 builds $N_b$ transmission paths from given $N_t$ spatial transmission resources of the transmitter. These resources may be antennas, antenna beams, or available polarization methods, for example. The operation of the beam former may be illustrated with a $N_b \times N_t$ matrix W. The output signal 312 of the beam former thus comprises $N_t$ parallel streams, and it is the converted to the used radio frequency and amplified in an amplifier 314 and transmitted with an antenna system 316.

The transmitter may further comprise a controller 318 controlling the operation of the transmitter.

The total power used for transmitting one modulation symbol from a given antenna or antenna beam is the sum of the squares of linear combination coefficients multiplying the modulation symbol that are used to construct the channel symbols transmitted from the antenna or antenna beam.

In a preferred embodiment, layered matrix modulation is utilized. A layer is a collection of one or more channel symbols that is constructed from a set of modulation symbols. These modulation symbols are not used when constructing any other layers. If there are more than one channel symbol in a layer, for each channel symbol constructed from a first set of modulation symbols, there exists at least one other channel symbol in the layer, constructed from a second set of modulation symbols, so that the first and the second set have at least one modulation symbol in common.

Assume an embodiment where the transmitter has two transmit paths, the receiver at least two antennas (or antenna beams) and the rate is 2. Thus, the space-time matrix has a 2×2 dimension. Let us further assume that a preceding matrix having a form of a 2×2 unitary matrix $$U(\mu, v) = \begin{bmatrix} \mu & v \\ -v^* & \mu^* \end{bmatrix} \quad (3)$$

is used to deliver a symbol vector $\tilde{x}_k = U x_k$ for layer k. In this embodiment, at least two transmit paths (antennas, antenna beams) are used. A layered symbol matrix is used by mapping symbols into a transmission matrix using more than one symbol layer. At least two symbols in at least one layer are precoded using parameters where $|\mu| \neq |v|$, $|\mu|$, $|v| \neq 0$, and optionally at least one of the numbers is complex (i.e. has non-zero imaginary part).

Furthermore, different layers may have different precoding matrices as long as at least one layer obeys the above constraint. Symbols in different layers may have different powers and/or symbol constellations (e.g. scalar rotations). The space-time code matrix modulation takes the following form:

$$X = \begin{bmatrix} \mu x_1 + v x_2 & e^{j\phi + \pi/4}(\mu x_3 + v x_4) \\ e^{j\phi + \pi/4}(\mu^* x_4 - v^* x_3) & \mu^* x_2 - v^* x_1 \end{bmatrix} \quad (4)$$

where $\phi + \pi/4$ is the rotation between layers, $|\mu| \neq |v|$, at least one of $\mu$, $v$ is a real number. The modulator of equation (4) is a threaded design based on the Hadamard basis.

In another embodiment, an i-threaded modulator may be used, being of the form $$X = \begin{bmatrix} \mu x_1 + v x_2 & e^{j\phi}(\mu x_3 + v x_4) \\ j e^{j\phi}(\mu^* x_4 - v^* x_3) & \mu^* x_2 - v^* x_1 \end{bmatrix} \quad (5)$$

where $|\mu| \neq |v|$.

The performance of (4) and (5) in Rayleigh fading channels are exactly the same, the j in the lower left corner of (5) may be split between the upper and lower off-diagonal corners by using a simple unitary similarity transform, which does not change performance. The result is of the form presented in (4). The advantage of the i-threaded design is that often optimal non-MSD precodings have $\phi = 0$. This allows us to use the same set of channel symbols for both antennas at all times.

In the modulators of equations (4) and (5), there are two layers. A diagonal layer is constructed from linear combinations of modulation symbols $x_1$ and x2, and an off-diagonal layer is constructed from modulation symbols $X_3$ and $X_4$.

Both the above matrixes are of non-MSD form. When using non-MSD precoding matrices with $|\mu| \neq |v|$, not only is PAR reduced (compared with MSD design), but in addition performance is improved. In comparison with a prior art Clifford-based scheme, the drawback of the presented matrices is a slight increase in detection complexity, especially if quasi-orthogonality-assisted detection methods are used. On the other hand, the non-MSD encoding method improves the performance of reduced Maximum Likelihood (ML) detection based on pruned trees. This follows from the non-MSD property where with a given channel realization some symbols are better encoded than others. The reduced search algorithm of ML can directly utilise this feature.

In an embodiment of the invention, i:th row of the modulation matrix X is transmitted using a given beam characterised by a beam forming vector $w_i$. Here $w_i$ is an M-dimensional vector, where M is the number of antenna elements used in transmission. One of the forming vectors, say $w_1$, may be the eigenvector corresponding to the largest eigenvalue of the channel correlation matrix. Respectively, another vector, say $w_2$, may be the eigenvector corresponding to the second largest eigenvalue, etc. In addition, the columns of the transmission matrix may be associated with different beam forming vectors, i.e. in the above example, the strongest beam $w_1$ may be allocated to some other column of the transmission matrix. This association generally depends on the properties of the transmission matrix.

In an embodiment of the invention, the symbols at different coordinates in all layers of the vector x may be selected from different modulation alphabets, or rotations thereof. For example, 90-degree rotated BPSK is modulated on the Q-axis, whereas conventional BPSK is modulated on the I-axis. For example, part of the symbols may be from QPSK alphabet and part from BPSK alphabet. Thus, it is possible to utilise different bit rates. For example, in the QPSK-BPSK case the throughput may be 2 bits on the first layer and 1 bit on the second layer, and the total bit rate would be 3 bps/Hz.

In an embodiment of the invention, a set of modulation matrices are formed according to the principles described above. For example, symbol states $Ux_1$ (for first diagonal layer) and $Ux_2$ (for second anti-diagonal layer) are constructed and a set of transmission matrices are formed from these symbol states using QPSK symbol constellations. Thus, we obtain $2^4 * 2^4 = 2^8$ modulation matrices each requiring two symbol periods to transmit $\log_2(2^8)/2=4$ bits per one symbol period. In other words, 8 bits are used to select one of many modulation matrices and each particular 8-bit sequence corresponds to the label (selection) associated with the mapping. This labeling may be completely determined by the labeling of streams within the two layers. However, in the embodiment, other labeling methods may also be used. Each transmission matrix may be re-labelled after the matrix has been formed. This re-labeling may be used, to make sure that different transmission matrices, close to each other e.g. via Euclidean metrics, are associated with similar labels, and vice versa, as a matrix extension to Gray labeling. Clearly, other labeling methods may be used and there is no restriction on the input alphabets, even if the aforementioned example uses QPSK input symbols. It is also remarked that two same or different input constellations may have the same or different labeling, thus inducing a labeling for the matrix-valued transmission matrix.

The performance of two embodiments of the proposed solution in comparison with a prior art solution are presented in FIG. 4. FIG. 4 shows simulated BER against Eb/No. The figure presents simulation results of 4 bps/Hz transmission in a two by two flat MIMO channel. The prior art solution 400 is from M. Damen, K. Abed-Meraim, and J.-C. Belfiore, Diagonal algebraic space-time block code, IEEE Trans. Inform. Theory, vol. 48, no. 3, pp. 628-636, March 2002. The first embodiment 402 is dilated 16-QAM and the second embodiment 404 is complex non-MSD. Damen et al. disclose an MSD concept, where as the proposed solutions are of non-MSD type. It is assumed that two transmit and two receive antennas are used. The parameters of the three compared concepts are in Table 1. The parameters comprise μ, ν, and φ. Furthermore, Table 1 shows performance as PAR (Peak to Average Ratio) and MIN DET which is calculated according to equation (2). FIG. 4 shows that the performance is indeed improved in non-MSD concepts 402, 404 compared with MSD 400. Also, we note that the MIN-DET is quite a reliable measure for performance.

TABLE 1

| Concept | Legend | μ | ν | φ | MIN DET | PAR |
|---|---|---|---|---|---|---|
| Damen et al | 400 | $1/\sqrt{2}$ | $e^{j\pi/4}/\sqrt{2}$ | π/8 | 0.17 | 1.71 |
| Dilated 16-QAM | 402 | 0.8507 | 0.526 | 0 | 0.89 | 1.89 |
| Complex non-MSD | 404 | 0.8881 | $e^{j\pi/4}$0.4597 | π/8 | 0.62 | 1.58 |

Channel symbol constellations corresponding to the dilated 16-QAM case 402 are depicted in FIG. 5A, in which the modulator of equation (4) is used. The channel symbols are indeed dilated 16-QAM symbols. The constellations are depicted for both transmit antennas and two signalling epochs. The channel symbol constellations corresponding to the complex non-MSD case 404 are depicted respectively in FIG. 5B.

If the preceding parameters are chosen as $\mu=2/\sqrt{5}$ and, $\nu=1/\sqrt{5}$, the MIN-DET and performance are slightly compromised, but the channel symbol constellations are exactly equidistant 16-QAM. It is remarkable that with the modulator of equation (5) and the mentioned parameters, each antenna transmits 16-QAM at all times; no rotations are needed. This implementation comes with a very low performance penalty.

Assume an embodiment where the transmitter has four transmit paths, the receiver four antennas (or antenna beams), and the rate is 2. The starting point is a Clifford-based scheme of following form:

$$X_{iDABBA} = \frac{1}{\sqrt{2}} \begin{bmatrix} X_A + X_C & X_B + X_D \\ j(X_B - X_D) & X_A - X_C \end{bmatrix}, \quad (6)$$

where $X_A$, $X_B$, $X_C$ and $X_D$ are of the STTD form (or of a form that corresponds to an arbitrary orthogonal (square) space-time block code):

$$X_A(x_1, x_2) = \begin{bmatrix} x_1 & x_2 \\ -x_2^* & x_1^* \end{bmatrix} \quad X_B(x_3, x_4) = \begin{bmatrix} x_3 & x_4 \\ -x_4^* & x_3^* \end{bmatrix}$$

$$X_C(x_5, x_6) = \begin{bmatrix} x_5 & x_6 \\ -x_6^* & x_5^* \end{bmatrix} \quad X_D(x_7, x_8) = \begin{bmatrix} x_7 & x_8 \\ -x_8^* & x_7^* \end{bmatrix}.$$

Equation (6) can be made full rank with a simple precoder that rotates the information symbols in STTD blocks $X_C$ and $X_D$:

$$x_{3,4,7,8} \to e^{j\phi} x_{3,4,7,8}.$$

In an embodiment, a non-MSD form of the modulation matrix may be formulated as:

$$X_{iDABBA/non} = \begin{bmatrix} \cos\rho X_A + \sin\rho X_C & \cos\rho X_B + \sin\rho X_D \\ j(\sin\rho X_B - \cos\rho X_D) & \sin\rho X_A - \cos\rho X_C \end{bmatrix}. \quad (7)$$

Written in terms of symbols, equation (7) becomes $$X_{iDABBA/non} = \begin{bmatrix} \cos\rho x_1 & \cos\rho x_2 & \cos\rho x_3 & \cos\rho x_4 \\ -\cos\rho x_2^* & \cos\rho x_1^* & -\cos\rho x_4^* & \cos\rho x_3^* \\ j\sin\rho x_3 & j\sin\rho x_4 & \sin\rho x_1 & \sin\rho x_2 \\ -\sin\rho x_4^* & \sin\rho x_3^* & -\sin\rho x_2^* & \sin\rho x_1^* \end{bmatrix} + \quad (8)$$

$$\begin{bmatrix} \sin\rho x_5 & \sin\rho x_6 & \sin\rho x_7 & \sin\rho x_8 \\ -\sin\rho x_6^* & \sin\rho x_5^* & -\sin\rho x_8^* & \sin\rho x_7^* \\ -j\cos\rho x_7 & -j\cos\rho x_8 & -\cos\rho x_5 & -\cos\rho x_6 \\ j\cos\rho x_8^* & -j\cos\rho x_7^* & \cos\rho x_6^* & \cos\rho x_5^* \end{bmatrix}$$

In the modulator of equation (8), there are four layers. The diagonal layer is constructed from linear combinations of modulation symbols $x_1$ and $x_5$, that is, elements $\cos\rho x_1$, $\cos\rho x_1^*$, $\sin\rho x_1$, $\sin\rho x_1^*$ on the diagonal of the first matrix and elements $\sin\rho x_5$, $\sin\rho x_5^*$, $-\cos\rho x_5$ and $\cos\rho x_5^*$ on the diagonal of the second matrix.

A (1,2), (2,1), (3,4) (4,3) layer is constructed from linear combinations of modulation symbols $x_2$ and $x_6$. Here (x,y)

denotes a matrix element which is on xth column, yth row. Thus, (1,2) denotes the element $-\cos \rho x_2^*$ in the first matrix and the element $-\sin \rho x_6^*$ in the second matrix, for example. A (1,3), (3,1), (2,4) (4,2) layer is constructed from linear combinations of modulation symbols $x_3$ and $x_7$. Finally, the anti-diagonal layer is constructed from linear combinations of modulation symbols $x_4$ and $x_8$.

The optimal non-MSD precoder does not need symbol rotation. Thus, all channel symbols are again dilated 16-QAM constellations, and in a preferred embodiment, all channel symbols are again pure equidistant 16-QAM symbols. Characteristics of MSD and non-MSD iDABBAs with different parameters are collected into Table 2. The optimizations are performed by maximizing MIN-DET for pairwise error events with up to 4 bit errors. The error events with least bit errors have the smallest Euclidean distance, so the diversity protection (indicated by MIN-DET) is most important for them. MIN-DET(4) and MIN-DET indicate the found minimum determinant for up to 4 bit errors and for any number of bit errors, respectively.

TABLE 2

| Concept | $\cos \rho$ | $\phi$ | MIN DET | MIN DET (4) | PAR |
|---|---|---|---|---|---|
| opt(4) MSD | 1 | 0.36 | 0.00043 | 2 | 1.94 |
| opt(4) non-MSD | 0.8881 | 0 | 0.0032 | 2.67 | 1.82 |
| 16-QAM | 0.8944 | 0 | N/A | 2.56 | 1.8 |

Assume an embodiment where the transmitter has four transmit paths, the receiver four antennas (or antenna beams), and the rate is 4. A transmission of this type may be constructed by transmitting two modulators of the form (5) in parallel:

$$X_{DiTHRD} = [X_{iTHRD}(x_1,x_2,x_3,x_4), X_{iTHRD}(x_5,x_6,x_7,x_8)] \quad (9)$$

Written in terms of symbols, equation (9) becomes $$X_{DiTHRD} = \begin{bmatrix} \mu x_1 + \upsilon x_2 & e^{j\phi}(\mu x_1 + \upsilon x_2) & \mu x_5 + \upsilon x_6 & e^{j\phi}(\mu x_7 + \upsilon x_8) \\ je^{j\phi}(\mu^* x_4 + \upsilon^* x_3) & \mu^* x_2 - \upsilon^* x_1 & je^{j\phi}(\mu^* x_8 - \upsilon^* x_7) & \mu^* x_6 - \upsilon^* x_5 \end{bmatrix} \quad (10)$$

In the modulator of equation (10), there are likewise four layers. The (1,1), (2,2) layer is constructed from linear combinations of modulation symbols $x_1$ and $x_2$, the (1,2), (2,1) layer is constructed from linear combinations of modulation symbols $x_3$ and $x_4$, and the (1,3), (2,4) layer is constructed from combinations of modulation symbols $x_5$ and $x_6$. The (1,4), (2,3) layer is constructed from combinations of modulation symbols $x_7$ and $x_8$.

In an embodiment, two transmit antennas are punctured from the non-MSD iDABBA modulation matrix of equation (7). The resulting transmission is equivalent to the two antenna beam transmissions of equation (5). By concatenating two such transmissions from antenna pairs 1-2 and 3-4, it is possible to construct rate 4 transmission. Thus, by puncturing antennas 2 and 4 from (7), the resulting matrix is $$X_{iDABBApunc} = \begin{bmatrix} \cos\rho x_1 + \sin\rho x_5 & \cos\rho x_3 + \sin\rho x_7 \\ \cos\rho x_2 + \sin\rho x_6 & \cos\rho x_4 + \sin\rho x_8 \\ j(\sin\rho x_3 - \cos\rho x_7) & \sin\rho x_1 - \cos\rho x_5 \\ j(\sin\rho x_4 - \cos\rho x_8) & \sin\rho x_2 - \cos\rho x_6 \end{bmatrix}. \quad (11)$$

The signal may be modelled using a signal model $Y=X_H+$ noise, where H is a matrix describing the transmission channel and Y is the received signal matrix. Thus, puncturing an antenna means puncturing a column of X. With this signal model, the true STTD may be expressed as $$\begin{bmatrix} x_1 & -x_2^* \\ x_2 & x_1^* \end{bmatrix}$$

Rows 1 and 3 are now the non-MSD modulator of equation (5) with odd numbered symbols, whereas rows 2 and 4 give the same with even numbered symbols. From the performance perspective, the modulators of equations (5), (7), and (9) are almost optimal, if $\rho = \arccos(2/\sqrt{5})$ which gives equidistant 16-QAM channel symbols.

In an embodiment, the channel symbols are constructed in the space-time modulator as linear combinations of complex modulation symbols. These channel symbols are transmitted via at least two transmit paths. For at least one modulation symbol, a first total power used for transmission on a first transmit path is non-zero, and a second total power used for transmission on a second transmit path is non-zero, and the first and second total powers are not equal.

The above feature realizes the non-MSD property for the modulation matrix. For example, assuming that two antennas or antenna beams are used in connection with the modulators of equations (4) and (5), the total power used for transmitting the modulation symbol $x_1$ is $|\mu|^2$ from antenna 1 and $|\upsilon|^2$ from antenna 2. In non-MSD solutions, $|\mu|^2 \neq |\upsilon|^2$.

When using the modulator of equation (8), the total power used for transmitting the modulation symbol $x_1$ is $(\cos \rho)^2$ from antennas 1 and 2, and $(\sin \rho)2$ from antennas 3 and 4. In non-MSD solutions, $(\sin \rho)^2 \neq (\cos \rho)^2$.

When using the modulator of equation (10), the total power used for transmitting the modulation symbol $x_1$ is $|\mu|^2$ from antenna 1, $|\upsilon|^2$ from antenna 2, and 0 from antennas 3 and 4. In these embodiments of non-MSD solutions, the zeros are omitted. It is required that $|\mu|^2 \neq |\upsilon|^2$.

In an embodiment, when constructing the channel symbols in the space-time modulator as linear combinations of complex modulation symbols, in at least one layer, at least a first and a second non-zero coefficient are used in the linear combination. In another embodiment, the ratio of the first and second coefficient is not a real number.

The above feature realizes a complex precoding property. For example, in the modulator realized according to equation (4), at least one of the ratios $\mu/\upsilon$, $\mu/\mu^*$, $\upsilon/\upsilon^*$ or $\upsilon/\mu^*$ is not a real number. This means that at least one of the parameters is a complex number. It should be noted that the layer multiplication factor $e^{j\phi+\pi/4}$ is cancelled when the ratio of the coefficients of the off-diagonal layer is taken.

In the two-layered modulator of equation (5), the ratios of co-efficients for the diagonal layer are $\mu/\upsilon$, $\mu/\mu^*$, $\upsilon/\upsilon^*$ and $\upsilon/\mu^*$, whereas the ratios of coefficients for the off-diagonal layer are $\upsilon\upsilon$, $j\mu/\mu^*$, $j\upsilon/\upsilon^*$ and $j\upsilon/\mu^*$. In this case, the layer multiplication factor $e^{j\phi}$ is cancelled when computing the ratios of the off-diagonal layer, but the term j remains. Thus, in an embodiment, either one of the diagonal layer ratios is non-real, meaning that at least one of µ or ν, is a complex number, and/or one of the off-diagonal layer ratios is non-real, which is true for any µ, ν, whether they are real or not.

Similarly, in the modulator of equation (8), in the (1,3), (3,1), (2,4) (4,2) layer, a ratio cos ρ/j cos ρ appears, which is non-real for any real ρ. The same applies to the modulator of equation (9).

In another embodiment, the precoding matrices are real, but such that the power disparity among symbols within a layer, transmitted at different times, is at least 20% against 80%.

Even though the invention is described above with reference to an example according to the accompanying drawings, it is clear that the invention is not restricted thereto, but it can be modified in several ways within the scope of the appended claims.

The invention claimed is:

1. A method, comprising:
constructing layered channel symbols as linear combinations of complex modulation symbols;
transmitting the layered channel symbols via at least two transmit paths;
using, when constructing the layered channel symbols, at least a first non-zero coefficient and a second non-zero coefficient in at least one layer when performing a linear combination, wherein a ratio of the first coefficient and the second coefficient is not a real number;
using, for at least one modulation symbol, a first non-zero total power for transmission on a first transmit path of the at least two transmit paths, and a second non-zero total power for transmission on a second transmit path of the at least two transmit paths; and
using, for at least another modulation symbol, the first non-zero total power for transmission on the second transmit path of the at least two transmit paths, and the second non-zero total power for transmission on the first transmit path of the at least two transmit paths,
wherein the first and second non-zero total powers are not equal.

2. A method of claim 1, further comprising:
using at least one complex precoder matrix comprising at least two non-zero elements comprising different transmission powers.

3. A method of claim 1, further comprising:
using at least one real precoder matrix,
wherein a transmission power ratio between the layered channel symbols transmitted at different times within a layer is at least 2/8.

4. A method of claim 1, further comprising:
transmitting the layered channel symbols via the at least two transmit paths at different times,
wherein the layered channel symbols transmitted using different transmit paths and different times form equidistant quadrature amplitude modulation constellations.

5. A method of claim 1, further comprising:
transmitting the layered channel symbols via the at least two transmit paths at different times,
wherein the layered channel symbols transmitted using different transmit paths and different times form a lattice.

6. A method of claim 5, wherein the lattice is equidistant.

7. An apparatus, comprising:
means for producing two transmit paths for transmission of a signal;
means for modulating the signal to be transmitted into complex modulation symbols; and
means for constructing layered channel symbols as linear combinations of the complex modulation symbols, wherein the means for constructing the layered channel symbols comprises means for constructing the layered channel symbols by using at least a first non-zero coefficient and a second non-zero coefficient in at least one layer when performing the linear combinations, wherein the ratio of the first and second non-zero coefficients is not a real number; and
means for transmitting the layered channel symbols by using, for at least one modulation symbol, a first non-zero total power for transmission on a first transmit path, and a second non-zero total power for transmission on a second transmit path, and for at least another modulation symbol, the first non-zero total power for transmission on the second transmit path, and the second non-zero total power for transmission on the first transmit path,
wherein the first and second non-zero total powers are not equal.

8. The apparatus of claim 7, wherein the means for transmitting comprises means for transmitting the layered channel symbols by using at least one complex precoder matrix comprising at least two non-zero elements comprising different transmission powers.

9. The apparatus of claim 7, wherein the means for transmitting comprises means for transmitting the layered channel symbols by using at least one real precoder matrix, and wherein a transmission power ratio between the layered channel symbols transmitted at different times within a layer is at least 2/8.

10. An apparatus, comprising:
a transmitter configured to produce two transmit paths for transmission of a signal;
a first modulator configured to modulate the signal to be transmitted into complex modulation symbols; and
a second modulator configured to construct layered channel symbols as linear combinations of the complex modulation symbols,
wherein the second modulator is further configured to construct the layered channel symbols by using at least a first non-zero coefficient and a second non-zero coefficient in at least one layer when performing the linear combination, wherein the ratio of the first and second non-zero coefficients is not a real number; and
wherein the second modulator and the transmitter are further configured to transmit the layered channel symbols by using, for at least one modulation symbol, a first non-zero total power for transmission on a first transmit path, and a second non-zero total power for transmission on a second transmit path, and for at least another modulation symbol, the first non-zero total power for transmission on the second transmit path, and the second non-zero total power for transmission on the first transmit path,
wherein the first and second non-zero total powers are not equal.

11. The apparatus of claim 8, wherein the transmitter is further configured to transmit the layered channel symbols by using at least one complex precoder matrix comprising at least two non-zero elements comprising different transmission powers.

12. The apparatus of claim 8, wherein the transmitter is further configured to transmit the layered channel symbols by using at least one real precoder matrix, and wherein a transmission power ratio between layered channel symbols transmitted at different times within a layer is at least 2/8.

13. The apparatus of claim 10, wherein the transmitter is further configured to transmit the layered channel symbols via the at least two transmit paths at different times, and wherein the layered channel symbols transmitted using different transmit paths and different times form equidistant quadrature amplitude modulation constellations.

14. The apparatus of claim 10, wherein the transmitter is further configured to transmit the layered channel symbols via the at least two transmit paths at different times, and wherein the layered channel symbols transmitted using different transmit paths and different times form a lattice.

15. The apparatus of claim 14, wherein the lattice is equidistant.

16. A system, comprising:
- a transmitter configured to produce two transmit paths for transmission of a signal;
- a first modulator configured to modulate the signal to be transmitted into complex modulation symbols; and
- a second modulator configured to construct layered channel symbols as linear combinations of the complex modulation symbols,
- wherein the second modulator is further configured to construct the layered channel symbols by using at least a first non-zero coefficient and a second non-zero coefficient in at least one layer when performing the linear combination, wherein the ratio of the first and second non-zero coefficients is not a real number, and
- wherein the second modulator and the transmitter are further configured to transmit the layered channel symbols by using, for at least one modulation symbol, a first non-zero total power for transmission on a first transmit path, and a second non-zero total power for transmission on a second transmit path, and for at least another modulation symbol, the first non-zero total power for transmission on the second transmit path, and the second non-zero total power for transmission on the first transmit path,
- wherein the first and second non-zero total powers are not equal.

* * * * *